W. C. STEWART.
WORK SUPPORT.
APPLICATION FILED NOV. 20, 1907. RENEWED APR. 14, 1909.
940,745.
Patented Nov. 23, 1909.
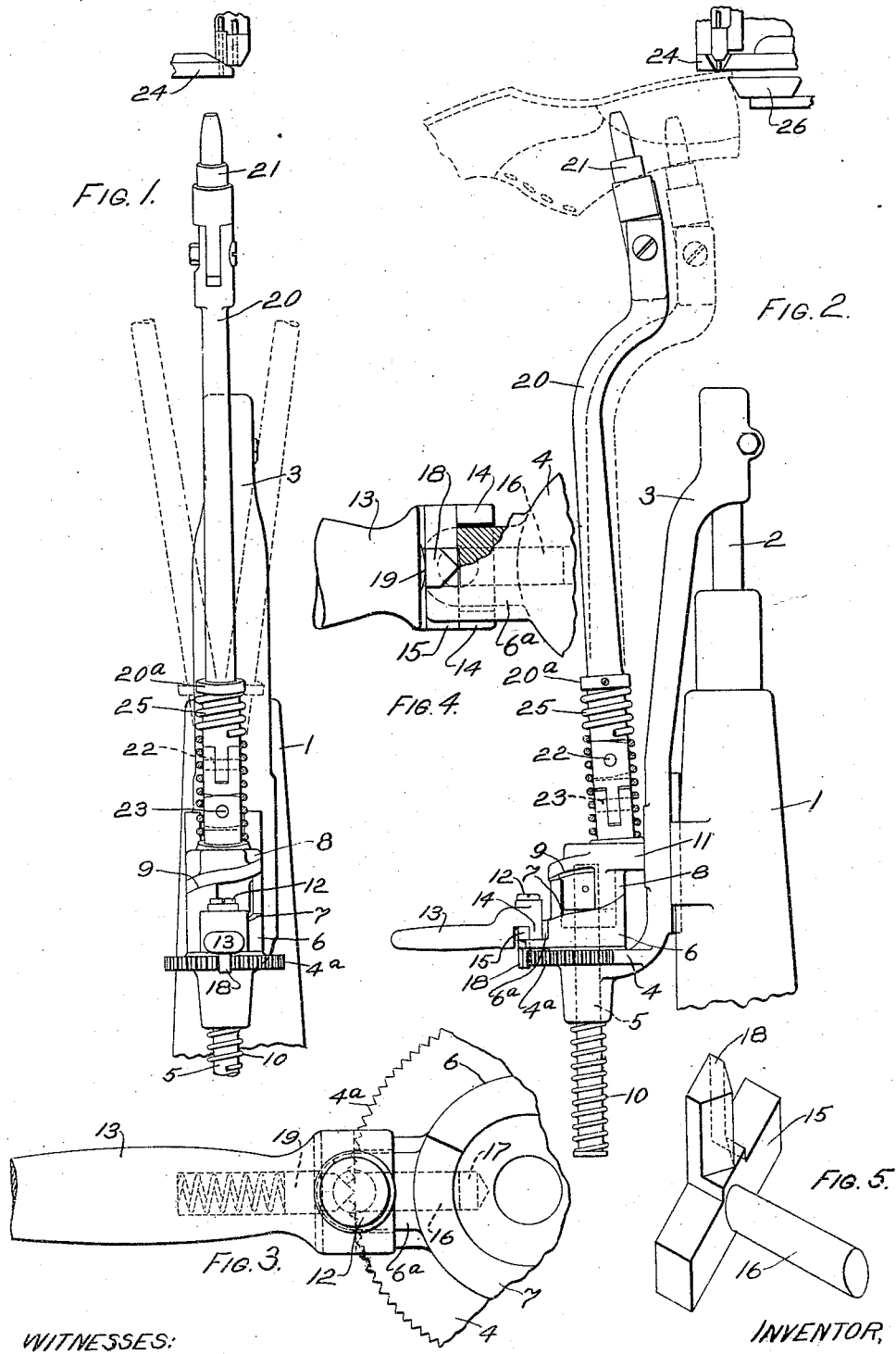
WITNESSES:
Powell F. Hatch.
Redfield H. Allen.
INVENTOR,
WILLIAM C. STEWART.
BY Robt. F. Hains.
ATTY.

UNITED STATES PATENT OFFICE.

WILLIAM C. STEWART, OF LYNN, MASSACHUSETTS, ASSIGNOR, BY MESNE ASSIGNMENTS, TO THOMAS G. PLANT, OF BOSTON, MASSACHUSETTS.

WORK-SUPPORT.

940,745.  Specification of Letters Patent.  Patented Nov. 23, 1909.

Application filed November 20, 1907, Serial No. 402,986. Renewed April 14, 1909. Serial No. 489,845.

*To all whom it may concern:*

Be it known that I, WILLIAM C. STEWART, a subject of the King of Great Britain, residing at Lynn, in the county of Essex and State of Massachusetts, have invented an Improvement in Work-Supports, of which the following description, in connection with the accompanying drawings, is a specification, like characters on the drawings representing like parts.

My invention relates to work supports and more particularly to work supports for use in connection with what are known as "metallic shoe machines", such as loose nailers, sluggers, protector drivers, etc.

The object of my invention is to provide a work support, the free end of which may be universally movable in a single plane and, at the same time, may be normally maintained in such position relatively to the machine head that the operative may conveniently and quickly place thereon or remove therefrom the work to be operated upon.

To the accomplishment of this object and such others which may hereinafter appear, my invention comprises the novel construction and combination of parts hereinafter described and particularly pointed out in the appended claims, reference being had to the accompanying drawing showing the most desirable form of the invention now known to me.

In the drawing: Figure 1 shows a front elevation of the work support showing in dotted lines the transverse movement of the support; Fig. 2 is a side elevation of Fig. 1, showing in dotted lines the relation of a lasted shoe to the nose plate of a shoe nailing machine when the work support is moved into operating position; Fig. 3 shows a plan of one form of means to lock the work support in its adjustment toward and from the nose plate; Fig. 4 is a bottom view of Fig. 3 with the ratchet removed and partly broken away to show details of construction; and Fig. 5 shows a perspective, greatly enlarged and inverted, of the detent used in the device for locking the work support shown in Figs. 3 and 4.

In the embodiment of the invention herein selected for illustration, 1 is a portion of the frame of any of the well known forms of fastener inserting machine used in the art of shoe making, for instance, the machine shown in the patent to Goddu 265,227, Sept. 26, 1882. Through this portion of the frame projects the spindle 2 of the work support which may be of any convenient form. I have selected for illustration a work support of the type embodying a jack post and pin which is carried upon a depending bracket 3 rigidly mounted on the spindle 2 by a set-screw or other convenient securing device. The lower end of the bracket 3 is formed into a table or supporting surface 4, having at its edge a series of ratchet teeth $4^a$ for a purpose presently to be made clear.

Through the table 4 extends a vertically arranged pin or stud 5, upon which, and resting on the table is rotatably mounted a collar 6 provided at its upper edge with a cam surface 7. Rigidly mounted upon the pin 5, and above the collar 6, is a second collar 8 provided at its lower edge with a complemental cam surface 9. These cam surfaces are maintained in engagement by means of a spring 10 on the lower end of the stud 5 and having bearings between a collar on the stud and the lower end of the depending bracket 3. The top of the upper collar 8 forms a shelf or rest on which the jack post is sustained. The collar 8 is also provided with a flat faced lug 11 at its rear side, which engages a plane surface or slideway formed upon the depending bracket 3, thus prohibiting any rotation of the stud 5 within its bearing in the depending arm.

With this construction, upon rotation of the collar 6 in one direction, the collar 8 is forced upwardly by the sliding contact of the engaging cams, carrying with it the stud 5 and thereby compressing the spring 10, the collar 8 being moved vertically by reason of the engagement of the lug 11 with the bearing face upon the bracket 3. On rotating the collar 6 in the opposite direction, expansion of the spring 10 lowers the collar 8.

In order to rotate the collar 6 so that the collar 8 and its sustained jack post may be vertically adjusted and locked in adjusted position, I preferably provide an operating device which may be constructed as follows: A stud screw 12 passes through the inner end of a handle piece 13 and a lug $6^a$ upon the collar 6, thus pivotally securing the handle and collar together. The handle 13 is formed at its inner end with a pair of depending hook shaped lugs 14 on either side of, but slightly distant, from the lug 6ª. The lugs 14 also project past and overlie a bar 15 extending transversely of the handle end within a slightly larger recess adjacent the lugs 14. This bar is provided with a guide pin 16 which projects between the lugs 14 and enters a hole 17 drilled therefor in the collar 6. The bar 15 is also provided with a depending wedge-faced dog or catch point 18 adapted to engage the ratchet teeth 4ª. The bar 15 is held pressed forwardly toward the collar 6 and in contact with the lugs 14, and the dog 18 maintained in engagement with the teeth 4ª, by means of a spring pressed plug 19 mounted in the handle 13. The construction is such that the center of the pivot screw 12 passes through the edge of the wedge-shaped face of the dog 18.
With such a construction it is clear that if the handle 13 is moved transversely in either direction about its pivot screw 12, one of the hook-shaped ears 14 will be moved away from the bar 15 and the other moved so as to press against said bar 15 and move it outwardly against the pressure of the plug 19, thereby withdrawing the dog 18 from engagement with the ratchet teeth 4ª. With the handle 13 in this position, with the dog 18 withdrawn from the ratchet teeth 4ª, upon further pressure in the same direction the collar 6 may be rotated about the stud 5 and the collar 8 raised or lowered, according to the direction in which the handle is moved.

By this arrangement of adjusting and locking device, there is provided a very simple and effective means for easily and quickly raising and lowering the collar 8 and with it the jack post relatively to the machine head.

As hereinbefore stated, upon the shelf formed by the upper surface of the collar 8 there is mounted the jack post 20 of the work support. This jack post is provided as usual at its upper end with any convenient form of last pin 21, which last pin may be angularly adjusted relative to its supporting post in the usual manner. In order that the last pin may have universal movement in a single and, as illustrated, in a horizontal plane, I provide toward the lower end of the post what may be termed a gimbal-joint. This gimbal-joint may be formed in a variety of ways, but I prefer to use the form illustrated in the drawing, in which the lower supporting end of the jack comprises two sections, said sections being secured to each other by a pivot pin 23 and the upper section being secured to the jack post by a pivot pin 22 extending at right angles to the pin 23. The contacting faces of the two members forming the gimbal-joint and of the upper member with the jack post, as clearly shown in the drawing, are so shaped as to limit movement of the last pin in any one direction.

Obviously, were there no support for the jack post other than the gimbal-joint, it would not be normally maintained in the most convenient position for the operator, that is, in alinement with the nose plate 24 of the machine head. It would fall normally into one of the dotted line positions indicated on the drawing. I have, therefore, provided means for maintaining the jack post in the most convenient work receiving position relative to said nose plate and yet allowing free movement about its gimbal-joint. In the form of my invention illustrated in the drawing, I have shown this means as a coiled spring 25, which surrounds the portion of the jack post forming the gimbal-joint, said spring being seated between a collar 20ª on the jack post and the upper surface of the collar 8. The collar 20ª is preferably adjustably secured to the jack post, for instance, by means of a set screw, so that it may be moved to vary the tension of the spring 25 according to the needs of the operative.

With this construction it is clear that if transverse pressure is applied to the jack post, the spring 25 will flex and allow transverse movement to take place, but upon release of the jack post by the operative, no matter in what position it may be, the spring 25 will bring it back to its normal position which, as determined by convenience, is substantially vertical and in alinement with the nose plate of the machine head. The spring 25, obviously, has the same effect on the jack post if it is moved in and out toward the machine head.

The effect of the spring 25 is to always maintain the jack post with its sections all in alinement. If then, the jack post be so mounted on the collar 8 that when its sections are in alinement the last pin is most conveniently situated relatively to the nose plate for the operative to place a shoe upon the last pin and remove the same therefrom, the spring 25 will normally maintain the post in this position. To this end, I preferably mount the jack post in alinement with the nose plate and at a slight outward inclination to the vertical when viewing the same in side elevation, as shown by full lines in Fig. 2, which leaves the last pin free of the machine head. After a shoe has been mounted upon the last pin, it is moved in toward the nose plate to the position shown in dotted lines in Fig. 2, and against the back gage 26 of the machine, but after the nailing operation has been completed and pressure on the jack post is removed, the spring 25 instantly forces the sections of the jack post into alinement and again brings the last pin sufficiently forward of the nose plate to allow easy removal of the shoe.

The movement of the last pin in the nailing operation is too well known by those skilled in the art to require description herein, and it is readily seen that a simple and effective construction to accomplish the end required is herein provided.

While my invention has been described with particular reference to the details of construction, it should be understood that it is not to be limited thereto, as many and various changes, alterations and substitutions may be made therein and still fall within its scope and principle.

What I claim, is:—

1. In a work support, a jack post mounted for universal movement of its last pin in a horizontal plane, and a yielding supporting member sustained by said jack post and constructed and arranged to flex laterally on movement of the jack post while maintaining said post normally in one position.

2. In a work support, a jack post jointed for universal movement of its last pin in a horizontal plane, and a coiled spring surrounding the jack post at said joint.

3. A work support comprising a jack post jointed for universal movement of its last pin in a horizontal plane, a coiled spring surrounding the jointed portion of the jack post, and means to vary the tension of said spring.

4. In a work support, a sectional jack post, said sections being so connected as to permit universal movement of the last pin of said post in a horizontal plane, and means embracing said sections for normally maintaining the same in alinement while permitting relative lateral movement thereof within said means.

In testimony whereof, I have signed my name to this specification, in the presence of two subscribing witnesses.

WILLIAM C. STEWART.

Witnesses:
ROSWELL F. HATCH,
GEORGE F. STEWART.